United States Patent [19]

Salvador Palacios et al.

[11] Patent Number: 5,998,324
[45] Date of Patent: Dec. 7, 1999

[54] PROCEDURE FOR THE REGENERATION OF CATALYSTS AND ADSORBENT MATERIALS

[75] Inventors: Francisco Salvador Palacios; Carmen Sanchez Jimenez, both of Salamanca, Spain

[73] Assignee: Universidad De Salamanca, Salamanca, Spain

[21] Appl. No.: 08/890,446

[22] Filed: Jul. 9, 1997

[30] Foreign Application Priority Data

Jul. 11, 1996 [ES] Spain ................................ 9601560

[51] Int. Cl.$^6$ ...................................... B01J 20/34
[52] U.S. Cl. .................... 502/22; 502/20; 502/56
[58] Field of Search .................. 502/20, 22, 56

[56] References Cited

U.S. PATENT DOCUMENTS

| | | | |
|---|---|---|---|
| 3,816,338 | 6/1974 | Corson et al. | 252/420 |
| 4,030,876 | 6/1977 | Akae et al. | 432/14 |
| 4,124,528 | 11/1978 | Modell | 252/411 |
| 4,147,624 | 4/1979 | Modell | 210/32 |

*Primary Examiner*—John F. Niebling
*Assistant Examiner*—Alexander G. Ghyka
*Attorney, Agent, or Firm*—Blank Rome Comisky & McCauley LLP

[57] ABSTRACT

Procedure for the regeneration of catalysts and adsorbent materials, which comprises the thermal desorption of adsorbed substances, with water in liquid condition, at high temperature or with water in supercritical condition, without oxidizing agents.

3 Claims, No Drawings

PROCEDURE FOR THE REGENERATION OF CATALYSTS AND ADSORBENT MATERIALS

BACKGROUND OF THE INVENTION

The present invention refers to a procedure for the recovery of catalysts and adsorbent materials, such as active carbon, by means of thermal desorption. The active carbon is an adsorbent with a high adsorption capacity versus a great variety of substances, due to which it has numerous industrial applications. During the adsorption process, the retention capacity of the carbon diminishes, until it is converted into a "depleted carbon", The regeneration of depleted carbons is of great economic interest, since it facilitates its recycling. Said regeneration mainly consists in the desorption of adsorbed substances and thus restoring the adsorption power of the carbon.

Numerous carbon regeneration procedures exist, though only a few are used at industrial level. Among these, the following may be mentioned: Thermal, biological; water vapour regeneration; extraction with solvents; extraction with supercritical $CO_2$; and wet oxidation.

In the thermal regeneration, the depleted carbon is subjected to a progressive and controlled heating, passing through successive stages: a) drying (water evaporation at 100° C.); b) thermal desorption (desorption of volatile compounds 100–260° C.): c) pyrolysis and carbonization (pyrolysis and carbonization of non volatile substances 200–650° C.; and b) gasification of the pyrolytic residue at high temperature (650–850° C.9) in the presence of limited quantities of an oxidant, such as water vapour, oxygen, etc. Said procedure is the most used at industrial scale. The main disadvantage resides in the gasification stage, since part of the carbon mass is also eliminated together with the pyrolyzed residue, due to the oxidation of the same.

The biological regeneration uses microorganisms which degrade the adsorbed substances.

In the regeneration with water vapour, the carbon is heated in the presence of water vapour, which acts as oxidant, degrading and destroying the retained compounds.

In the extraction with organic solvents, the carbon is contacted with an appropriate solvent, which dissolves the adsorbed substances.

The extraction with supercritical $CO_2$, uses $CO_2$ as solvent, at a temperature and a pressure over that of its critical point (31.1° C. and 72 bar).

In the regeneration by wet oxidation, hot water in liquid condition is used (temperatures and pressure below critical point, 374° C. and 215 bar), to which air is added (oxygen). The hot water and the oxygen dissolve, oxidize and destroy the adsorbed substances. The disadvantage of said method, lies in that the oxygen also oxidizes the carbon, especially if the temperature is high. Over 250° C., the oxidation of the carbon is so rapid, that great losses of carbon are produced during the treatment.

SUMMARY AND DESCRIPTION OF THE INVENTION

The present invention proposes the recovery of catalysts and adsorbent materials, such as active carbon, by means of thermal desorption.

Spanish Patent Application No. 9201729, of the same applicants, describes a programmed thermal desorption procedure and device, specially conceived as an analysis technique of the desorbed substance, though it is pointed out, that both the procedure and the device may be applied to the recovery of adsorbents and catalysts. According to said procedure, the heating of the sample to be desorbed, is conducted in a programmed manner. That is to say, that a lineal heating is produced throughout time. Additionally, the entrainment of the desorbed substance shall be carried out by means of a solvent in liquid condition and which must remain in said condition throughout all the heating phase so as to ensure that the desorption is carried out in liquid phase. The dissolved, desorbed substance is entrained towards an analysis zone. In subsequent researches developed by the applicant, it has been confirmed that when the previously described procedure is applied to the recovery of adsorbents and catalysts, not only is it necessary to conduct the heating of the sample in a programmed manner, but it is also advisable that the temperature at which the desorption is to be carried out, be reached as soon as possible and in the most rapid manner.

Likewise, it has been confirmed that the desorption, applied to the recovery of adsorbents, such as the active carbon, may be conducted at temperatures over those at which the liquid phase may be kept.

On the other hand, for the recovery of adsorbents and catalysts, the analysis and entrainment zone of the substance desorbed up to said zone, may be dispensed with.

According to the present invention, for the recovery of catalysts and adsorbent materials, the thermal desorption of substances at 374° C. and at a pressure over 215 bar. the desorption is conducted without the addition of air, oxygen or other oxidant. Since no oxidant exists, the adsorbent (for example carbon) or catalyst does not oxidize and, in consequence, it is possible to increase the treatment temperature, even in the supercritical water zone. Therefore, it deals with a thermal desorption in which the water in liquid or supercritical condition dissolves or extracts the adsorbed substances.

If additionally, it is desired that the regeneration treatment be as innocuos as possible, the desorbed substances may be destroyed by adding an oxidant to the effluent water of the treatment, (air, oxygen, etc.) which shall oxidize them without the adsorbent or catalysts being present.

In the desorption procedure which is the object of Patent 9201729, the desorption is conducted by means of a liquid (if water is used, the temperature would have to be below 374° C.), heated in a programmed manner (lineal heating throughout time), simultaneously analyzing and recording the desorbed substance.

In the procedure which is the object of the present invention, the thermal desorption extends throughout a wider range of temperatures since supercritical water may be used. On the other hand, a lineal heating is not necessary, only holding the desorption process to a set temperature, for a time. It is also unnecessary to analyze and record the desorbed substances, since now, the interest is centered in the recovery of the solid (catalyst or adsorbent material).

In short, the procedure of the invention permits the recovery of catalysts and adsorbent materials in an efficient manner and without loss or partial destruction of the catalyst or adsorbent material.

What is claimed:

1. A process for the regeneration of catalysts or adsorbent materials, comprising: (a) thermally desorbing from said catalyst or adsorbent materials adsorbed substances using water containing no oxidizing agents, said water being applied at a temperature greater than 374° C. and in a supercritical condition; and (b) destroying said adsorbed substances by oxidation.

2. Process according to claim 1, wherein the regenerated material is active carbon.

3. Process according to claim 1, wherein once the desorption temperature has been reached, said temperature is held during the time the desorption phases lasts.

* * * * *